Feb. 27, 1968  J. P. GREENING  3,371,198

SIGNAL SELECTION FOR CORRELATION

Filed Nov. 4, 1964  2 Sheets-Sheet 1

INVENTOR.
J. P. GREENING
BY Young & Quigg
ATTORNEYS

INVENTOR.
J.P. GREENING
BY Young & Quigg
ATTORNEYS 3,371,198
SIGNAL SELECTION FOR CORRELATION
John P. Greening, Bartlesville, Okla., assignor to Phillips
Petroleum Company, a corporation of Delaware
Filed Nov. 4, 1964, Ser. No. 408,830
6 Claims. (Cl. 235—181)

This invention relates to the selection of electrical signals sequentially in a preselected manner.

In various fields of signal interpretation, there is a need to select certain signals in sequence in order that the signals selected can be compared or processed together. One specific example of this need occurs in the processing of seismic signals to determine common vibration patterns in a plurality of recorded traces. This determination of common vibration patterns can often be facilitated by performing auto- or cross-correlation operations. When a large number of signals are to be correlated, it is necessary to have automatic switching mechanism which is capable of selecting the individual signals to be compared in a preselected manner.

In accordance with this invention, apparatus is provided which is capable of selecting individual signals in sequence from each of two groups of signals. A first signal is selected from the first group, at which time the signals of the second group are selected sequentially. This operation is repeated for each of the individual signals of the first group. The signal selecting apparatus of this invention is capable of operating automatically and making the selections without repetition of any given pair of signals. This selection is accomplished by means of stepping switches, together with control circuits for operating the stepping switches in a preselected manner.

Accordingly, it is an object of this invention to provide apparatus for selecting in sequence individual signals from groups of signals.

Another object is to provide apparatus for use in correlating seismic signals.

Other objects, advantages and features of the invention should become apparent from the following detailed description which is taken in conjunction with the accompanying drawing in which.

Figure 1:
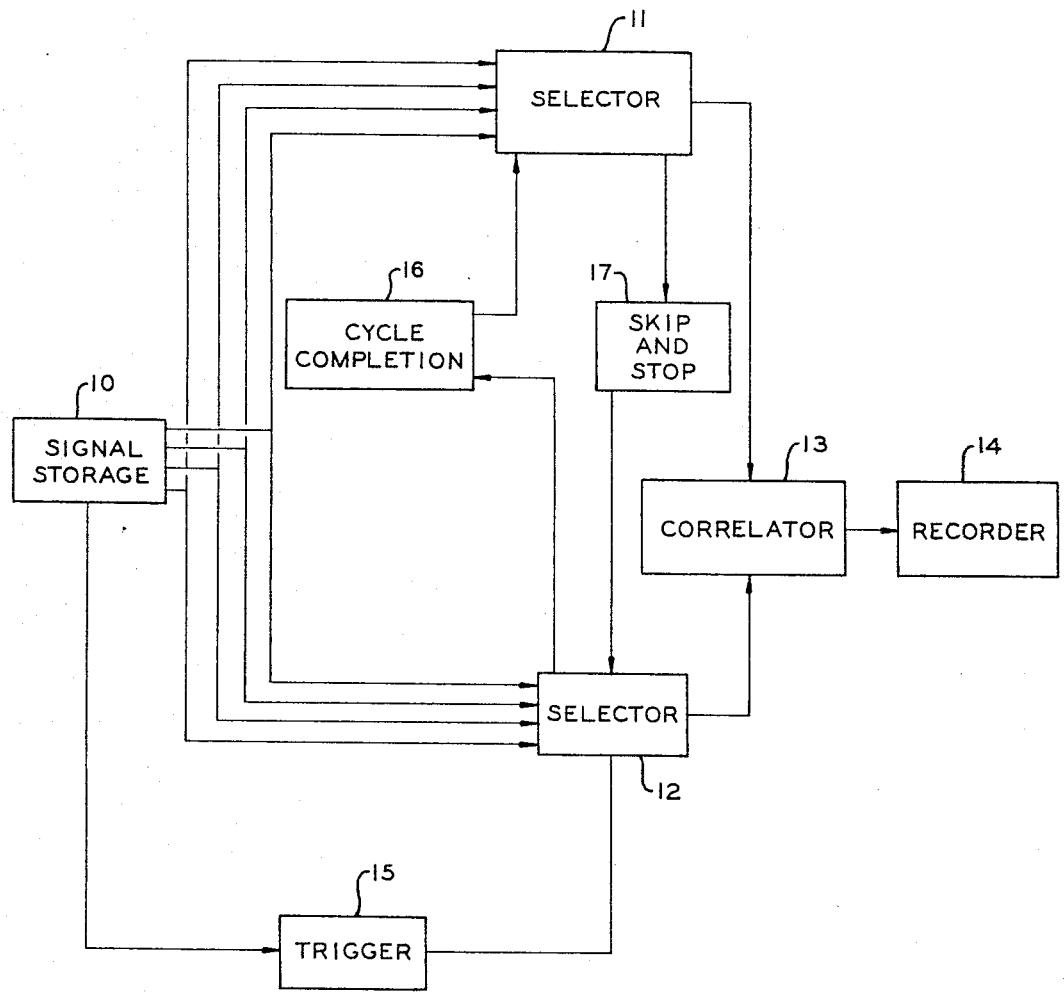
FIGURE 1 is a schematic representation of the signal correlation apparatus of this invention.

Referring now to the drawing in detail and to FIGURE 1 in particular, there is shown a schematic representation of apparatus which is adapted for use in correlating electrical signals. The signals to be correlated are stored in a signal storage means 10. This storage means can advantageously be a drum which has one or more magnetic tapes mounted thereon. The individual signals to be correlated are stored on the magnetic tape or tapes. The signals to be correlated are applied to a first selector switch 11 and to a second selector switch 12. The individual signals are applied simultaneously to the two selector switches. If a magnetic tape storage drum is employed as element 10, for example, the output signals are established by a plurality of reproducing heads positioned adjacent the individual tracks of the magnetic tapes. An output control signal is removed from storage means 10 and transmitted to the input of a trigger circuit 15. Trigger circuit 15 actuates selector 12 in the manner described hereinafter in detail. Selector circuits 11 and 12 apply a selected one of the input signals thereto to the respective inputs of a correlator 13. Correlator 13 can be any device capable of measuring the auto- or cross-correlation between the input signals. Suitable apparatus for use in this manner is described in copending application Serial No. 5,935, filed Feb. 1, 1960, now Patent 3,163,750, entitled "Signal Correlation Measurement."

For purposes of discussion, it will be assumed that there are $n$ individual signals to be correlated. It is desired to correlate each of these signals with itself (auto-correlation) and with each other signal (cross-correlation). The signal pairs which are correlated by the apparatus of FIGURE 1 and the sequence of correlation are shown schematically in the following table:

Signal Pairs

| 1,1 | 1,2 | 1,3 | 1,n |
|---|---|---|---|
|  | 2,2 | 2,3 | 2,n |
|  |  | 3,3 | 3,n |
|  |  |  | n,n |

As can be seen in the top row of the table, signal No. 1 is correlated in sequence with itself and each remaining signal. As shown in the second line of the table, signal No. 2 is then correlated in sequence with itself and each remaining signal other than No. 1. It can be seen that one less correlation is required in the second line because it is not necessary to correlate signal No. 2 with signal No. 1. This was accomplished in the first sequence of operation. Similarly, one less correlation is required in each of the following lines of the table. The apparatus illustrated schematically in FIGURE 1 selects the signals in such a manner as to eliminate any possible duplication. A signal from selector 12 actuates a cycle completion network 16 which energizes selector 11. A signal from selector 11, in turn, actuates a skip and stop network 17 which controls selector 12 so as to avoid duplication of signals being compared.

Figure 2:
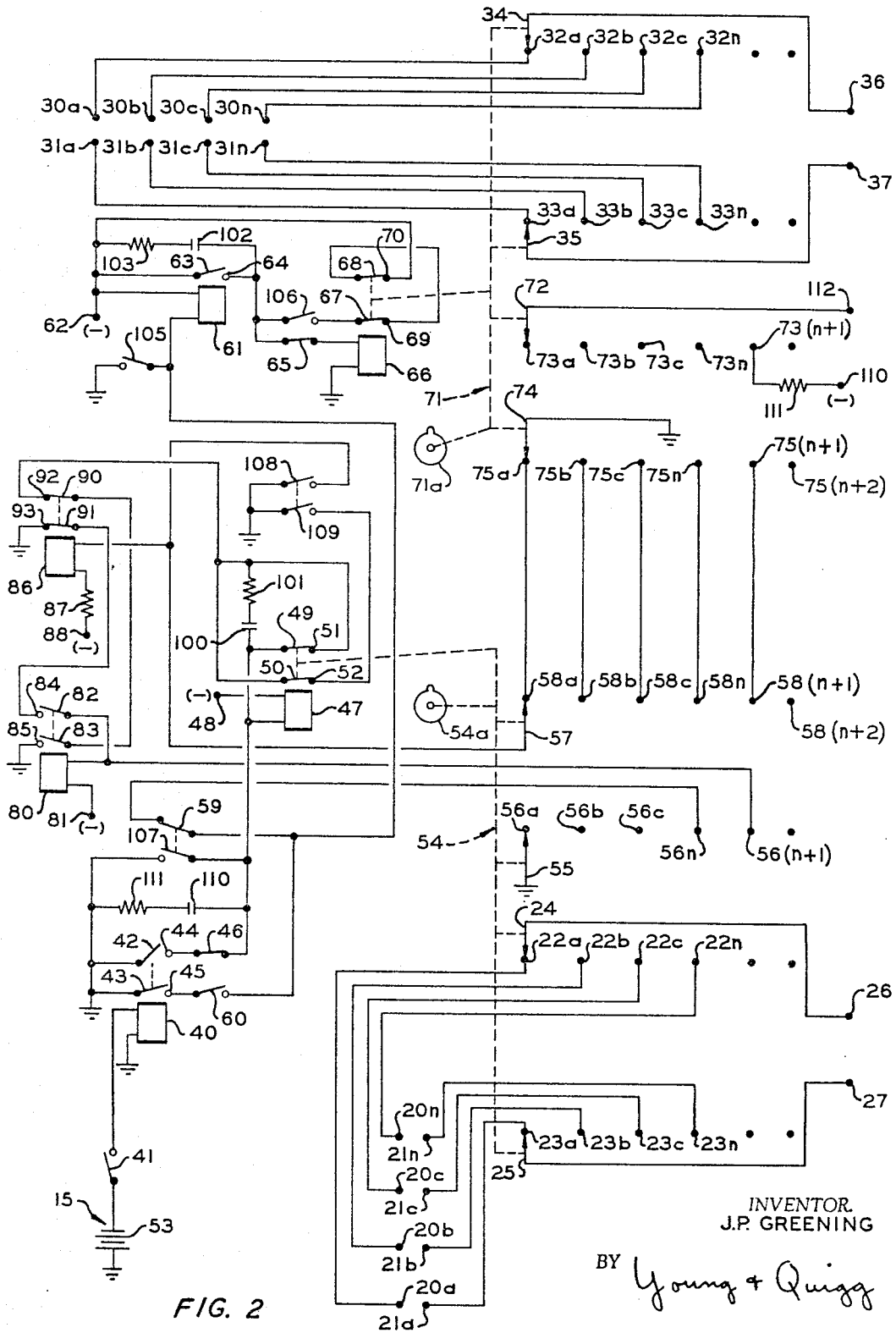
FIGURE 2 is a schematic circuit drawing of an embodiment of the signal selection portion of the correlation apparatus of FIGURE 1.

Details of the switching network of FIGURE 1 are shown in FIGURE 2. The apparatus of FIGURE 2 is provided with first pairs of input terminals 20a, 21a, 20b, 21b, 20c, 21c ... 20n, 21n. These terminals represent a first set of output terminals from signal storage means 10 of FIGURE 1. Terminals 20a to 20n are connected to respective contacts 22a to 22n of the first bank of a stepping switch 54. For this embodiment, switch 54 has $n+2$ steps. A switch arm 24, which is connected to an output terminal 26, engages contacts 22a to 22n in sequence when stepping switch 54 is energized. Terminals 21a to 21n are connected to respective contacts 23a to 23n of the second bank of stepping switch 54. A switch arm 25, which is connected to output terminal 27 is adapted to engage contacts 23a to 23n in sequence. Output terminals 26 and 27 are connected to one of the inputs of correlator 13 of FIGURE 1. The second group of input signals from storage means 10 is applied to respective terminals 30a, 31a; 30b, 31b; 30c, 31c ... 30n, 31n. Terminals 30a to 30n are connected to respective contacts 32a to 32n of the first bank of a second stepping switch 71. For this embodiment, switch 71 also has $m+2$ steps. Switch arm 34, which is connected to an output terminal 36, engages contacts 32a to 32n in sequence when stepping switch 71 is energized. Terminals 31a to 31n are connected to respective contacts 33a to 33n which form the second bank of stepping switch 71. Switch arm 35, which is connected to an output terminal 37, engages contacts 33a to 33n in sequence. Output terminals 36 and 37 are connected to the second input of correlator 13 of FIGURE 1.

The apparatus of FIGURE 2 is actuated by signals from trigger circuit 15 of FIGURE 1. This trigger circuit can be actuated by a switch 41 in signal storage device 10, which switch is closed momentarily each time the tape storage drum is rotated. The closing of switch 41 applies an electrical pulse from a voltage source 53 to the first terminal of a relay coil 40, the second terminal of which is grounded. Closure of switch 41 thus energizes relay coil 40. This moves a switch arm 42 into engagement with a terminal 44, while switch arm 43 is moved into engagement with a terminal 45. Switch arm 43 is connected to ground, and terminal 45 is connected through a normally open switch 60 to the arm of a switch 59. Switch arm 42 is connected to ground, and terminal 44 is connected through a normally closed switch 46 to the first terminal of a relay coil 47, the second terminal of which is connected to a terminal 48 which is maintained at a negative potential. Relay coil 47 actuates a switch arm 49, moving it out of engagement with a terminal 51, and also actuates the switching mechanism of stepping switch 54. When stepping switch 54 is on position $n+1$, and relay coil 47 is deenergized, stepping switch 54 moves to position $n+2$, and a cam 54a moves switch arm 50 out of engagement with terminal 52. Cam 54a, which rotates with the stepping switch, is of such design as to engage switch arm 50 only once during each cycle. The stepping switch is cocked when relay coil 47 is energized, and steps when relay coil 47 is deenergized. Thus, each pulse from trigger 15 results in movement of stepping switch 54 to the next position.

At the beginning of the operation, stepping switches 54 and 71 are both on the respective a positions and switch 60 is open, as illustrated. Thus, the No. 1 signal is applied through selectors 11 and 12 to correlator 13 (FIGURE 1). At the completion of this cycle, which can be after one revolution of the storage drum, a pulse is transmitted through switch 41 to energize and then deenergize relay coils 40 and 47. This actuates stepping switch 54 to move the switch arms to the respective b contacts. Stepping switch 71 remains deenergized at this time so that the No. 1 signal originally applied through selector 11 continues to be transmitted, whereas signal No. 2 is applied through selector 12 since switch arms 24 and 25 are now on respective contacts 22b and 23b. This sequence of operation continues with switch arms 24 and 25 moving sequentially down the respective banks of contacts. This provides the first cycle of the correlation shown in the top line of the foregoing table.

Stepping switch 54 is provided with a third switch arm 55 which engages contacts 56a, 56b, 56c . . . 56n and $56(n+1)$ in sequence. Stepping switch 54 is also provided with a fourth arm 57 which engages contacts 58a, 58b, 58c . . . 58n and $58(n+1)$ in sequence. Switch arm 55 is connected to ground. Contact 56n is connected through a normally closed switch 59 to the junction between switches 59 and 60, which is also connected to the first terminal of a relay coil 61, the second terminal of which is connected to a terminal 62 which is maintained at a negative potential. When relay coil 61 is energized, a switch arm 63 engages a terminal 64. Switch arm 63 is connected to terminal 62, and terminal 64 is connected through a normally closed switch 65 to the first terminal of a relay coil 66, the second terminal of which is connected to ground. When relay coil 66 is energized, switch arm 68 is moved out of engagement with terminal 70. When stepping switch 71 is on position $n+1$, and relay coil 66 is deenergized, stepping switch 71 moves to position $n+2$, and a cam 71a moves switch arm 67 out of engagement with terminal 69. Cam 71a is similar to cam 64a. Terminal 69 is connected to switch arm 68, and terminal 70 is connected to terminal 62. Relay coil 66 actuates stepping switch 71 in the same manner that relay coil 47 actuates stepping switch 54.

At the end of the first cycle of the correlation operation, switch arm 55 is moved into engagement with contact 56n. This completes a circuit to energize relay coil 61, which in turn energizes relay coil 66. When the next input pulse closes switch 41 once again, switch arm 55 moves into engagement with contact $56(n+1)$ to deenergize relay coils 61 and 66, thereby actuating stepping switch 71 to move all of the switch arms thereof to the respective b positions. This transmits signal No. 2 to correlator 13 through selector 11.

Contact $56(n+1)$ is connected to the first terminal of a relay coil 80, the second terminal of which is connected to a negative potential terminal 81. Switch arms 82 and 83 are moved into engagement with respective terminals 84 and 85 when relay coil 80 is energized. Terminal 85 is connected to ground, and switch arm 83 is connected to a switch arm 90 which is actuated by a relay coil 86. Contact $56(n+1)$ is also connected to switch arm 82. Terminal 84 is connected to a switch arm 91 which is normally closed to engage terminal 93, switch arm 91 being actuated by relay coil 86. Switch arm 57 of stepping switch 54 is connected to the first terminal of relay coil 86, the second terminal of which is connected through a resistor 87 to a negative potential terminal 88. When switch arm 55 is moved into engagement with contact $56(n+1)$, relay coil 80 is energized. This moves switch arm 82 into engagement with terminal 84 so that the first terminal of relay coil 80 is connected to ground through switch arm 91 and terminal 93, thereby locking relay coil 80 in the energized position. At the same time, switch arm 83 is closed to terminal 85 so that the second terminal of relay coil 47 is grounded through switches 49, 90 and 83. Relay coil 47 of stepping switch 54 is thus in a self-interrupting position. Each time relay coil 47 is energized, switch 49 is opened to deenergize the relay coil. This in turn closes switch 49 so that the relay coil is once again energized. This operation continues at a rapid pace until such time as switch arm 57 is grounded through a switch arm 74 of stepping switch 71. Contacts 58a to $58(n+1)$ of stepping switch 54 are connected directly to respective contacts 75a to $75(n+1)$ of stepping switch 71. Switch arm 74 engages these latter contacts in sequence when stepping switch 71 is energized. Switch arm 74 is connected to ground so that switch arm 57 is connected to ground whenever switch arm 57 engages a contact which is connected directly to the contact engaged by switch arm 74. When this occurs, relay coil 86 is energized to open switches 90 and 91. The opening of switch 90 deenergizes relay coil 47 to terminate movement of stepping switch 54. Relay coil 80 is unlocked at this time since switch 91 is opened. This circuit thus constitutes skip and stop network 17 of FIGURE 1. Stepping switch 54 moves at the beginning of each cycle to such a position that there is no duplication of signals being correlated.

Stepping switch 71 is provided with a fourth switch arm 72 which is adapted to engage contacts 73a to $73(n+1)$ in sequence. Switch arm 72 is connected to an output terminal 112. Contact $73(n+1)$ is connected through a resistor 111 to a negative potential terminal 110. When switch arm 72 engages contact $73(n+1)$, a negative potential is applied to terminal 112. This terminates the entire operation by transmitting a pulse which stops the motor (not shown) that drives the drum in the signal storage means. If it should be desired to repeat the operation automatically, this particular circuit can be eliminated.

A capacitor 100 and a resistor 101 are connected in series between the switch arm 49 and terminal 51. This network is to prevent arcing of relay 47 contacts. A similar circuit comprising a capacitor 102 and a resistor 103 is associated with the contacts of relay coil 61 or 66, and a capacitor 110 and a resistor 111 are associated with the contacts of relay coil 40. A switch 105 is provided to step relay 61 manually, if desired. A switch 106 is provided to reset stepping switch 71. Relay coil 66 is in a self-interrupting position as long as switch 106 remains closed. This action terminates on position ($n+2$) when switch 67 is opened. Similarly, actuation of switch 107 steps stepping switch 54; opening of switch 59 prevents stepping switch 71 from operating on position $n$. Switches 108 and 109 permit stepping switch 54 to be reset, relay coil 40 being in a self-interrupting position as long as switch 109 is closed. This action terminates on position ($n+2$) when switch 52 is opened. Switch 108 energizes relay coil 86 during this time to disable contact $56(n+1)$. Switch 65 is provided to disable stepping switch 71. Switch 46 is provided to disable stepping switch 54. Switch 60 is provided to allow both stepping switches 54 and 71 to be operated simultaneously from the trigger 15.

While this invention has been described in conjunction with a presently preferred embodiment, it obviously is not limited thereto.

What is claimed is:

1. Signal selection apparatus comprising:
   a plurality of first input terminals adapted to receive respective first input signals;
   a plurality of second input terminals adapted to receive respective second input signals;
   first and second output terminals;
   first switching means to connect said first input terminals in sequence to said first output terminal;
   second switching means to connect said second input terminals in sequence to said second output terminal; and
   means to actuate said first and second switching means to connect each of said second input terminals in sequence to said second output terminal for preselected time intervals and to connect said first input terminals in sequence to said first output terminal during the first of said predetermined time intervals and to connect said plurality of first input terminals, less one for each succeeding time interval, to said first output terminal, while a sequential second input terminal is connected to said second output terminal.

2. Signal selection apparatus comprising:
   a plurality of first input terminals adapted to receive respective first input signals;
   a plurality of second input terminals adapted to receive respective second input signals;
   first and second output terminals;
   a first stepping switch to connect said first input terminals in sequence to said first output terminal;
   a second stepping switch to connect said second input terminals in sequence to said second output terminal;
   means to actuate said first stepping switch repetitively to connect said first input terminals in sequence to said first output terminal;
   means responsive to said first stepping switch being in a first preselected position to actuate said second stepping switch; and
   means responsive to said first stepping switch being in a second preselected position to advance said first stepping switch from said second preselected position until said first and second stepping switches are in preselected positions relative to one another.

3. The apparatus of claim 2, further comprising a voltage source, a third output terminal, and means responsive to said second stepping switch being in a preselected position to connect said voltage source to said third output terminal.

4. Signal selection apparatus comprising:
   a plurality of first input terminals adapted to receive respective first input signals;
   a plurality of second input terminals adapted to receive respective second input signals;
   first and second output terminals;
   a first stepping switch having at least first, second and third banks of contacts and associated switch arms;
   means connecting said first input terminals to respective ones of said first bank of contacts, and means connecting said first output terminal to said first switch arm;
   a first coil to move the switch arms of said first stepping switch when energized;
   means to apply current to said first coil periodically;
   a second stepping switch having at least fourth and fifth banks of contacts and associated switch arms;
   means connecting said second input terminals to respective ones of said fourth bank of contacts, and means connecting said second output terminal to said fourth switch arm;
   a second coil to move the switch arms of said second stepping switch when energized;
   means connecting said second bank of contacts to respective ones of said fifth bank of contacts;
   first circuit means to energize said second coil when said third switch arm engages a first preselected one of said third contacts;
   second circuit means to energize said first coil repetitively when said third switch arm engages a second preselected one of said third contacts; and
   third circuit means to deactivate said second circuit means when said second and fifth switch arms engage corresponding ones of their respective associated contacts.

5. Apparatus for measuring the correlation between signals comprising:
   a plurality of first input terminals adapted to receive respective first input signals;
   a plurality of second input terminals adapted to receive respective second input signals;
   signal correlation means having first and second inputs;
   first switching means to connect said first input terminals in sequence to said first input;
   second switching means to connect said second input terminals in sequence to said second input; and
   means to actuate said first and second switching means to connect said of said second input terminals in sequence to said second output terminal for preselected time intervals and to connect said first input terminals in sequence to said first output terminal during the first of said predetermined time intervals and to connect said plurality of first input terminals, less one for each succeeding time interval, to said first output terminal, while a sequential second input terminal is connected to said second output terminal.

6. Apparatus for measuring the correlation between signals comprising:
   a plurality of first input terminals adapted to receive respective first input signals;
   a plurality of second input terminals adapted to receive respective second input signals;
   signal correlation means having first and second inputs;
   a first stepping switch having at least first, second and third banks of contacts and associated switch arms;
   means connecting said first input terminals to respective ones of said first bank of contacts, and means connecting said first input to said first switch arm;
   a first coil to move the switch arms of said first stepping switch when energized;
   means to apply current to said first coil periodically;
   a second stepping switch having at least fourth and fifth banks of contacts and associated switch arms;
   means connecting said second input terminals to respective ones of said fourth bank of contacts, and means connecting said second input to said fourth switch arm;

a second coil to move the switch arms of said second stepping switch when energized;

means connecting said second bank of contacts of respective ones of said fifth bank of contacts;

first circuit means to energize said second coil when said third switch arm engages a first preselected one of said third contacts;

second circuit means to energize said first coil repetitively when said third switch arm engages a second preselected one of said third contacts; and third circuit means to deactivate said second circuit means when said second and fifth switch arms engage corresponding ones of their respective associated contacts.

No references cited.

MALCOLM A. MORRISON, *Primary Examiner.*

F. D. GRUBER, *Assistant Examiner.*

UNITED STATES PATENT OFFICE
CERTIFICATE OF CORRECTION

Patent No. 3,371,198                      February 27, 1968

John P. Greening

It is certified that error appears in the above identified patent and that said Letters Patent are hereby corrected as shown below:

Column 6, line 46, for "said", first occurrence, read -- each --.

Signed and sealed this 24th day of June 1969.

(SEAL)
Attest:

Edward M. Fletcher, Jr.                   WILLIAM E. SCHUYLER, JR.
Attesting Officer                          Commissioner of Patents